April 7, 1964  C. DE J. HERCULES  3,127,920
RESILIENT CUSHION TIRE AND WHEEL
Filed May 1, 1963
FIG. 1
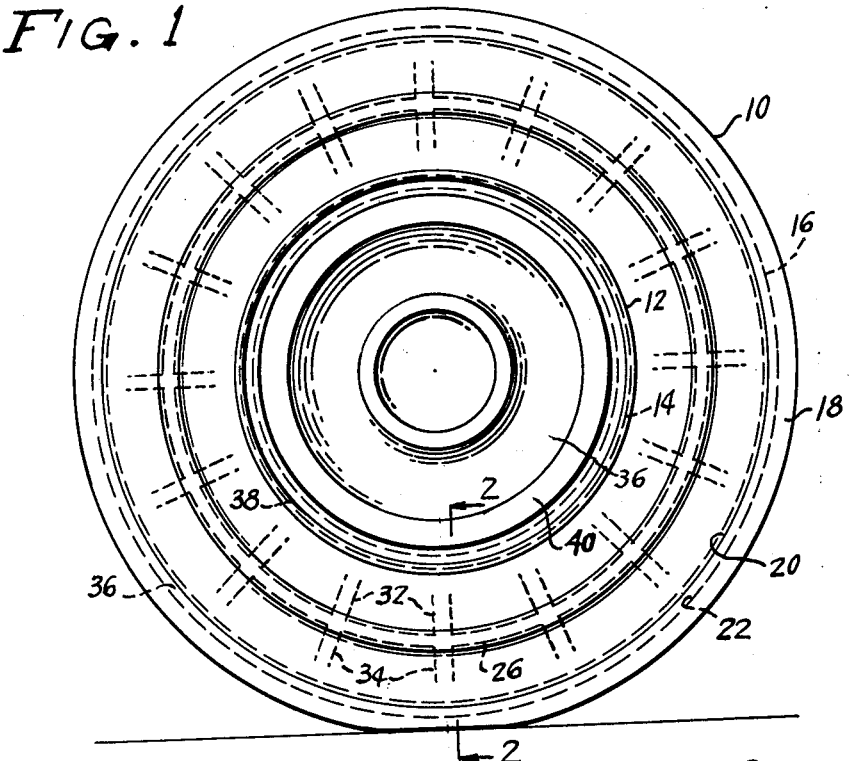
FIG. 3
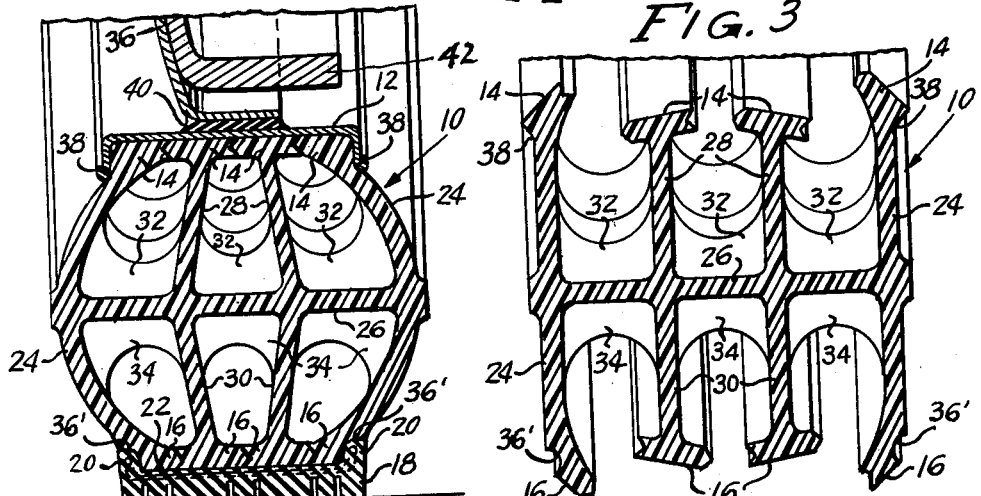
FIG. 2
FIG. 4
INVENTOR.
C. DE JEAN HERCULES
BY Walter S. Paul.
ATTORNEY.

United States Patent Office 3,127,920
Patented Apr. 7, 1964

3,127,920
RESILIENT CUSHION TIRE AND WHEEL
Christopher De J. Hercules, 4640 Q St. NW.,
Washington, D.C.
Filed May 1, 1963, Ser. No. 277,331
8 Claims. (Cl. 152—325)

This invention relates to resilient cushion tires for vehicles.

The object of this invention is to devise a vehicle wheel tire having an external casing shaped generally like the conventional pneumatic tire, but provided with sufficiently stiff internal webbing for resiliently supporting the outer wall against substantial collapse, within the normal range of loading of the vehicle, without requiring any super atmospheric pressurization.

A further object is to provide additional resilient cushioning means in the form of a sleeve between the hub portion of the wheel and the tire rim.

A further object is to form said internal webbing by a strip extending laterally between the side walls of the tire casing all the way around the tire, a plurality of annular strips extending inwardly and outwardly from said lateral strip to the rim wall and the tread wall, respectively, and reenforcing radial webs between said strips and the side walls, and spaced annularly at equal intervals around the tire.

A further object is to make the tread separately mountable over a protruding treadwall, which comprises interlocked outer end portions of said side walls and of said strips extending outwardly from the lateral strip, the rim wall of said tire casing comprising interlocked inner end portions of said side walls and of said strips extending inwardly from said lateral strip.

Other and more specific objects will become apparent in the following detailed description of one form of this invention, as illustrated in the accompanying drawing, wherein:

FIG. 1 is an elevational side view of the tire mounted on a wheel,

FIG. 2 is a radial sectional view of the wheel and tire taken on the line 2—2 of FIG. 1, FIG. 3 is a similarly taken sectional view of the unmounted tire casing, and FIG. 4 is an enlarged sectional view of the tread.

The preferred form and construction of the novel tire as illustrated in the drawings comprises a molded or otherwise assembled casing and framework structure 10 of suitably stiff resilient material mountable on a wheel rim 12 having a flat bottomed well for receiving the inner wall portion 14 of the tire casing, the separate ring portions of which are stretched over it and interlocked to provide a firm mounting for the tire.

The outer wall 16 of the tire casing is formed by mounting the tread band 18 over it. The separate ring portions forming the outer wall of the tire casing are compressed and interlocked by forcing them successively into the internal well of the tread band from one side over the unstretchably reenforced flange 20 on said side, and pushing them toward the other flange, interlocking their edges as shown, the resilient pressure of compression between the outer wall of the casing and the internal well 22 is sufficient to firmly hold the tread band in place. The well may be lined with a flexible but substantially non-stretchable reenforcement lining, such as steel, nylon, etc.

The casing and framework structure comprises the casing side walls 24 connected by a median cylindrical strip 26 providing lateral support to the side walls and having one or more inwardly extending brace strips 28 spaced between said side walls, each brace strip connected to a ring portion of the inner wall 14. The lateral support strip 26 further has one or more outwardly extending brace strips 30 spaced between said side walls, each strip 30 being connected with a ring portion of the outer wall 16 of the casing. Laterally extending radial webs 32 and 34 may be provided between the lateral support strip and the brace strips 28 and 30, respectively, as well as the side walls 24 for more lateral stability of the tire. These webs 32 and 34 are suitably closely spaced annularly in the tire.

A sleeve of resilient material 40 may be provided in the wheel between its hub portion 36 and the rim 12, to reduce transmission of vibrations from the road. A conventional brake band 42 may be mounted on the inside of the hub portion 36, as partially shown in FIG. 2.

The tread band 18, when worn out, may be readily replaced and is comparatively inexpensive. The tire does not have to be air tight and is therefore puncture proof and blow-out proof.

Many obvious modifications in the detail form and arrangement of the frame structural supporting members may be made without departing from the spirit and scope of the present invention as defined in the appended claims.

What is claimed is:

1. A hollow vehicle tire comprising a one-piece carcass having outer flexible casing walls and internal bracing strip and web structure of substantially stiff but resilient material, the inner edges of said casing walls and bracing strips being adapted to form a beaded inner-wall surface for stretchably mounting in a flat-bottomed well tire rim, and the outer edges of said casing walls and bracing strips being adapted to form a beaded outer-wall surface for compressively mounting in a flat-bottomed well substantially flexible tread band, said walls and structure being stiff enough to resiliently support the casing walls against substantial deformation thereof on the road under maximum vehicle loading.

2. A hollow tire as defined in claim 1, said internal bracing structure including a median brace strip extending horizontally between said outer casing walls, and at least one intermediate brace strip extending inwardly from said median strip in substantially vertical planes equally spaced between said side walls, to the inner wall of said casing, and at least one intermediate brace strip extending outwardly from said median strip in substantially vertical planes equally spaced between said side walls, to the outer wall of said casing.

3. A hollow tire as defined in claim 2, and a vehicle wheel having a flat-bottomed well tire rim adapted to receive said tire, the beaded inner wall of said casing being externally correspondingly ridged for stretchably mounting in said rim well.

4. A hollow tire and wheel as defined in claim 3, said ridged inner wall of said casing being formed, when mounted on the rim, by separate interlocking rings comprising the inner edge portions of the side walls and inwardly extending brace strips.

5. A hollow tire and wheel as defined in claim 4, and a tread band having an inner substantially flat-bottomed groove, the outer wall of said casing being ridged correspondingly for compressive insertion into said groove when said tread band is mounted thereover.

6. A hollow tire and wheel as defined in claim 5, said outer casing wall being formed by separate outer edge ring portions of said side walls and said outwardly extending brace strips respectively, said ring portions having interlocking groove and ridge edges.

7. A hollow tire and wheel as defined in claim 6, and axially extending web strips on both sides of said median strip between the side walls and the brace strips, and annularly spaced about the tire at equal intervals to add to the lateral stability of the tire.

8. A hollow tire and wheel as defined in claim 7, said wheel having an annular band of resilient material between its hub portion and said tire rim, to reduce transmission of road shocks and vibrations to the vehicle.

References Cited in the file of this patent
UNITED STATES PATENTS

| | | |
|---|---|---|
| 508,466 | Buck et al. | Nov. 14, 1893 |
| 1,262,186 | Drury | Apr. 9, 1918 |
| 1,336,790 | Simms | Apr. 13, 1920 |
| 1,366,080 | Kaufman | Jan. 18, 1921 |